(12) United States Patent
Chan et al.

(10) Patent No.: US 7,552,091 B2
(45) Date of Patent: Jun. 23, 2009

(54) METHOD AND SYSTEM FOR TRACKING GOODS

(75) Inventors: Benson Chan, Vestal, NY (US); How Lin, Vestal, NY (US); William Maines, Binghamton, NY (US); Voya Markovich, Endwell, NY (US)

(73) Assignees: Endicott Interconnect Technologies, Inc., Endicott, NY (US); Maines Paper and Food Service, Inc., Conklin, NY (US)

( * ) Notice: Subject to any disclaimer, the term of this patent is extended or adjusted under 35 U.S.C. 154(b) by 777 days.

(21) Appl. No.: 10/860,067

(22) Filed: Jun. 4, 2004

(65) Prior Publication Data

US 2005/0289019 A1 Dec. 29, 2005

(51) Int. Cl.
*G06Q 99/00* (2006.01)
(52) U.S. Cl. ...................................................... 705/50
(58) Field of Classification Search ............... 705/50–79
See application file for complete search history.

(56) References Cited

U.S. PATENT DOCUMENTS

| | | | | |
|---|---|---|---|---|
| 4,688,026 A | * | 8/1987 | Scribner et al. | ............. 235/385 |
| 4,744,939 A | | 5/1988 | Gold et al. | |
| 4,831,539 A | | 5/1989 | Hagenbuch | |
| 4,901,933 A | | 2/1990 | Crites | |
| 5,304,786 A | | 4/1994 | Pavlidis et al. | |
| 5,382,784 A | * | 1/1995 | Eberhardt | ............. 235/462.46 |
| 5,478,990 A | * | 12/1995 | Montanari et al. | .......... 235/375 |
| 5,495,250 A | * | 2/1996 | Ghaem et al. | .................. 342/51 |
| 5,565,324 A | | 10/1996 | Still et al. | |
| 5,595,356 A | * | 1/1997 | Kewin | ...................... 242/613.5 |
| 5,640,002 A | * | 6/1997 | Ruppert et al. | ......... 235/462.46 |
| 5,721,099 A | | 2/1998 | Still et al. | |
| 5,838,253 A | * | 11/1998 | Wurz et al. | ............... 340/10.42 |
| 6,130,602 A | * | 10/2000 | O'Toole et al. | .......... 340/10.33 |
| 6,169,974 B1 | | 1/2001 | Baumgartner et al. | |
| 6,182,053 B1 | * | 1/2001 | Rauber et al. | ................ 235/375 |

(Continued)

FOREIGN PATENT DOCUMENTS

CA        2 345 763 A1    6/2000

(Continued)

OTHER PUBLICATIONS

Muller, "Desktop Encyclopedia of the Internet", 1999, Artech House Inc., Norwood, MA, all pages.*

(Continued)

*Primary Examiner*—Andrew J. Fischer
*Assistant Examiner*—Jacob C Coppola
(74) *Attorney, Agent, or Firm*—Mark Levy; Lawrence R. Fraley; Hinman, Howard & Kattell

(57) ABSTRACT

A method and system for tracking goods, etc., food products, which involves identifying the received goods at a specified location and thereafter assigning an encoded readable code to each of the goods which can be only accessed by authorized personnel responsible for handling the goods on through to and including shipment, e.g., to customers. A host computer includes a database for encoding received identification data and thereafter encoding same to provide the readable codes. The method and system also allows the customer/recipient to access the codes to discern whether he/she has received the correct goods he purchased.

1 Claim, 1 Drawing Sheet

U.S. PATENT DOCUMENTS

| | | | |
|---|---|---|---|
| 6,232,876 B1 * | 5/2001 | Maloney | 340/568.1 |
| 6,267,291 B1 * | 7/2001 | Blankenship et al. | 235/375 |
| 6,357,662 B1 * | 3/2002 | Helton et al. | 235/462.45 |
| 6,415,978 B1 * | 7/2002 | McAllister | 235/462.01 |
| 6,445,810 B2 | 9/2002 | Darrell et al. | |
| 6,506,342 B1 | 1/2003 | Frankel | |
| 6,510,799 B2 | 1/2003 | Lamb et al. | |
| 6,557,758 B1 * | 5/2003 | Monico | 235/380 |
| 6,594,692 B1 | 7/2003 | Reisman | |
| 6,617,583 B1 | 9/2003 | Bawendi et al. | |
| 6,758,403 B1 * | 7/2004 | Keys et al. | 235/462.45 |
| 6,763,996 B2 * | 7/2004 | Rakers et al. | 235/375 |
| 2002/0035524 A1 | 3/2002 | Husslage | |
| 2002/0120475 A1 | 8/2002 | Morimoto | |
| 2004/0024644 A1 | 2/2004 | Gui et al. | |

FOREIGN PATENT DOCUMENTS

| | | |
|---|---|---|
| DE | 198 44 631 A1 | 9/1998 |
| EP | 2001328711 | 11/2001 |
| GB | 2 332 540 A | 6/1999 |
| JP | 2001-328711 | 11/2001 |
| WO | 95/29437 | 11/1995 |

OTHER PUBLICATIONS

Gralla, "How the Internet Works", Millennium Edition, 1999, Que Corporation, Indianapolis, IN, all pages.*
White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
Dobler et al., "Purchasing and Supply Management", McGraw-Hill, 1996, 6th edition, all pages.*
Greene, "Production and Inventory Control Handbook", McGraw-Hill, 1997, all pages.*
"Encoding methods for combinatorial chemistry", Current Opinion in Chemical Biology, 1997, 1:60-66.
"Radiofrequency Encoded Combinatorial Chemistry", Nicolaou et al, Angew Chem. Int. Ed. Engl. 1995, 34, No. 20, pp. 2289-2291.
"Tagging in combinatorial chemistry: the use of coloured and fluorescent beads", Chem. Commun., 1997, 735-736.

* cited by examiner

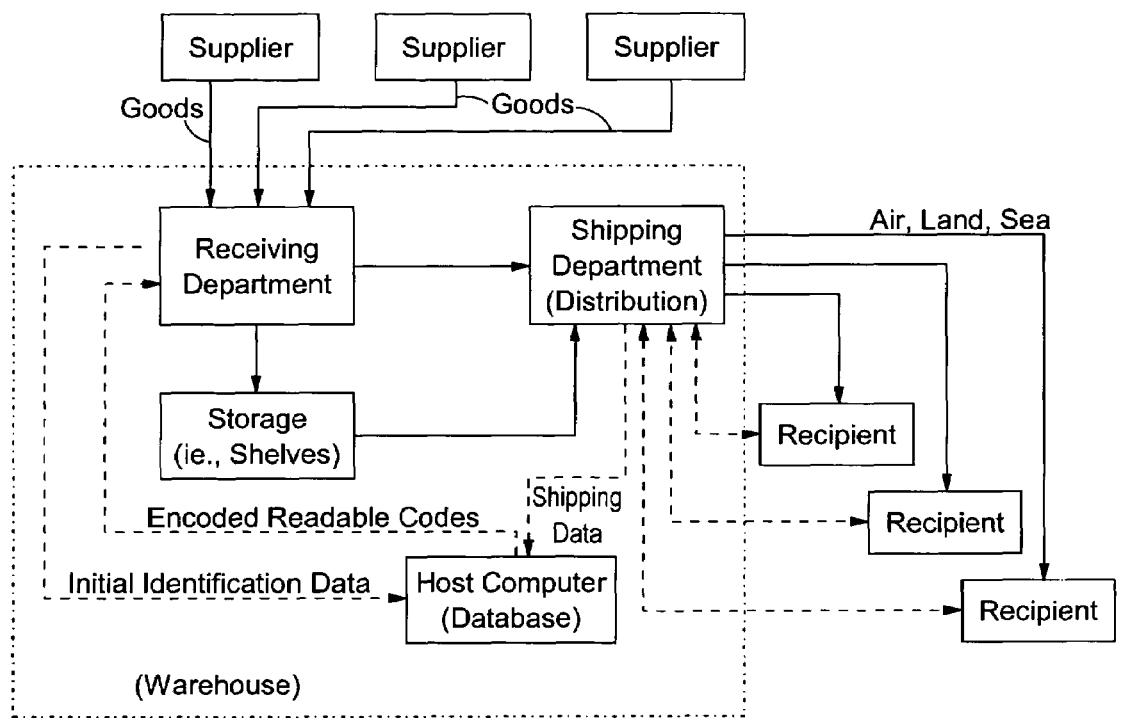

METHOD AND SYSTEM FOR TRACKING GOODS

TECHNICAL FIELD

This invention relates to the tracking of various goods such as food products. More particularly, the inventions relates to a system and method for effectively tracking goods as part of a receiving and distribution process such as where the goods are received within a common location such as a warehouse and then shipped to designated customer locations distant from the warehouse.

BACKGROUND OF THE INVENTION

In today's highly competitive commercial environment, it is imperative that products reach the marketplace quickly and effectively. This is especially important for products such as food products, particularly when such products are of the perishable variety. Given today's security-conscious environment, it is also imperative that such products are assured safe and secure transport to the final destinations thereof, such that tampering and theft are effectively prevented. Finally, it is imperative that effective accountability of each product in the distribution process occur, to assure that the end customer receives and pays for the correct goods he/she has purchased.

Although the invention defined above mentions food products, this is not meant to limit the scope of the invention because the teachings herein are equally applicable to receiving and distribution of all sorts of goods, including such goods as electronic packaging components (e.g., printed circuit boards and cards, chip carriers, etc.), electronic components (e.g., computers, servers, etc.), and a multitude of others of many different sizes and shapes. As defined herein, the invention is also applicable to effective receipt and distribution of both large and small quantities of such goods, and of goods of many different cost levels.

The ability to track the location and identity of quantities of goods during a storage and/or distribution process has presented a significant challenge for both industry and science. For example, the demands of keeping track of consumer products, such as food products, jewelry, and the like, and the strong interest in effective identification devices (perhaps the most classic today being credit/debit cards with personal photo identification thereon), has led to the need for a secure, relatively fast, yet readily inexpensive to operate, tracking system. Additionally, emerging technologies such as combinatorial chemistry, genomics research, and microfluidics also require the ability to identify and track the location of large numbers of items, especially in the science industry and other industries shipping goods such as chemicals, powders, and the like.

One known method for tracking the location and/or identity of a good is the utilization of Universal Product Code (UPC) technology, or, as also known, "barcode" technology. As known, barcodes use a linear array of elements that are either printed directly on goods or on labels that are affixed to the goods. These barcode elements typically comprise bars and spaces, with bars of varying widths representing strings of binary "ones" and spaces of varying widths representing strings of binary "zeros". Barcodes can be detectable optically using devices such as scanning laser beams or handheld wands, or these can be implemented in magnetic media. The readers and scanning systems electro-optically decode the symbol to multiple alpha-numerical characters that are intended to be descriptive of the article or some characteristic thereof. Such characters are typically represented in digital form as an input to a data processing system for applications such as in point-of-sale processing and inventory control, these latter two being only examples of many such applications.

Typically, traditional barcodes typically only contain five or six letters or digits. However, two dimensional bar codes have also been developed in which one-dimensional bar codes are stacked with horizontal guard bars between these to increase the information density. For example, U.S. Pat. No. 5,304,786 describes the use of a high density two-dimensional bar code symbol for use in bar code applications.

Another technology that has been developed for labeling objects includes a composition comprising silicon or silicon dioxide microparticles and a powder, fluid or gas to be applied to goods such as vehicles, credit cards and jewelry (see WO 95/29437 for a description of such usage). This system typically allows the formation of several million particles on a single wafer, each of the particles on one wafer being designed to be of identical shape and size so that when the particles are freed from the wafer substrate one is left with a suspension containing a single particle type which can thus be identified and associated with a particular item (good).

In addition to the aforementioned bar coding and micro particle tracking schemes, emerging technologies such as combinatorial chemistry has also resulted in the development of various encoding schemes (See, for example, Czamik, A. W., "Encoding Methods for Combinatorial Chemistry", *Curr. Opin. Chem. Biol.*, 1997, 1, 60). The need for this development has arisen in part from the split and pool technique utilized in combinatorial chemistry to generate libraries on the order of one million compounds. Split and pool synthesis involves dividing a collection in beads into N groups, where N represents the number of different reagents being used in a particular reaction stage, and after the reaction is performed, pooling all of these groups together and repeating the split and pool process until the desired reaction sequence is completed. Clearly, in order to keep track of each of the compounds produced from a reaction series, the beads must be "tagged" or encoded with information at each stage to enable identification of the compound of interest or the reaction pathway producing the compound. The tags used to encode the information, however, must be robust to the conditions being employed in the chemical synthesis and must be easily identifiable to obtain the information. Exemplary encoding techniques that have been developed include the use of chemically robust small organic molecules ("tags") that are cleaved from the bead after the synthesis is completed and analyzed using mass spectroscopy (see U.S. Pat. Nos. 5,565,324 and 5,721,099 for descriptions of this technology).

In yet another example, one of more recent vintage, radiofrequency encoded combinatorial chemistry combines recent advances in microelectronics, sensors, and chemistry and uses a single or multiple addressable radiofrequency tag semiconductor unit to record encoding and other relevant information along the synthetic pathway (Nicolaou et al, *Angew. Chem. Int. Ed Engl.* 1995, 34, 2289). Still another example of on-bead decoding includes the use of colored and fluorescent beads (Egner et al., *Chem. Commun.* 1997, 735), in which a confocal microscope laser system is used to obtain the fluorescence spectra of fluorescent dyes.

As understood from the following, the present invention provides a new and unique method and system for tracking goods, including those of the several different types mentioned hereinabove, and others, which can be operated expeditiously at relatively low cost, and which assures safe and secure shipment such that a receiver of the desired goods will know he/she is receiving exactly the type and quantity of goods he/she has requested.

It is believed that such a method and system will constitute significant advancements in the art.

OBJECTS AND SUMMARY OF THE INVENTION

It is, therefore, a primary object of this invention to provide a new and unique tracking method and system which assures improved accountability and security for the goods being tracked.

It is another object of the invention to provide such a method and system which can each be operated expeditiously and at relatively low cost.

It is still another object of this invention to provide such a method and system which is capable of utilizing existing technologies such as those described above, including particularly the use of barcode technology.

According to one aspect of the invention, there is provided a method of tracking goods, the method comprising receiving goods at a specified location, identifying each of the goods in accordance with a particular characteristic thereof at this specified location and thereafter providing these characteristics for each of the identified goods to a host database. The method further comprises encoding each of these characteristics and producing a distinct encoded readable code for each of the good, applying one of the distinct encoded readable codes to each of the goods in accordance with a predetermined characteristic thereof, reading the distinct encoded readable codes of the goods and providing these readings to the host database. The method further comprises distributing the goods having the distinct encoded readable codes thereon to selected recipients at selected locations located distant from the specified location.

According to another aspect of the invention, there is provided a system for tracking goods, the system comprising a specified location for receiving the goods, a host computer having a database, apparatus for identifying each of the goods in accordance with a particular characteristic thereof at this specified location and thereafter providing these characteristics to the database of the host computer, apparatus for encoding each of the characteristics of the identified goods and producing a distinct encoded readable code for each of the goods to the host computer database. The system further includes an applicator for applying one of the distinct encoded readable codes to each of the goods in accordance with a predetermined characteristic thereof, apparatus for reading these distinct encoded readable codes of the goods and providing the readings to the host computer database, and distributing means for distributing the goods having the distinct encoded readable codes thereon to selected recipients at selected locations located distant from the specified location.

BRIEF DESCRIPTION OF THE DRAWING

The Drawing illustrates a system for tracking goods during a receiving and distribution process in accordance with one embodiment of the invention. The method as defined herein is also readily discernible from the and will be described even more fully in the following description

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described. It is understood that like numerals will be used to indicate like elements from FIG. to FIG.

The present invention defines a method and system for quickly and efficiently tracking goods of many different types such that these goods are properly received by a designated location such as a warehouse or the like and thereafter correctly distributed (transported) to designated recipients such as customers so that these customers are assured reception of the proper goods they purchased. A key aspect of this invention involves the assigning of encoded readable codes for the receiving goods following identification thereof at receipt such that only authorized personnel will have access to such readable codes in order to correctly discern the contents thereof. As explained, it is also possible within the scope of this invention to allow recipients/customers to have access to codes in order to be assured they receive the goods they ordered. The method and system is workable for all kinds of goods, from perishable food products to chemical and powder materials held in adequate containers. The invention uses known technologies for the most part and is thus relatively easy to operate and relatively inexpensive to build and maintain. The invention is adaptable in an environment where the goods are received and then shipped to the designated recipients or, alternatively, where the goods are temporarily stored after receipt and before shipment. Effective tracking from receipt to storage (optional) to shipment and finally to the recipient is thus possible using the unique teachings of this invention.

As shown in the, the present system initially involves the receipt of goods from designated suppliers 11 (three shown in the) into the receiving location (department or the like) of a specified location 15, one prime example being a warehouse facility or the like. The invention is adapted for tracking and distributing received goods having already provided thereon appropriate indicia such as the aforementioned bar codes which identify the goods according to a particular characteristic. Examples of such particular characteristics include the type of goods, the number of goods (e.g., within a single container such as a box), the weight and/or total volume, etc. It is not necessary, however, according to the teachings herein that such goods be already identified in such a manner upon receipt. If such indicia is not provided, one of the initial steps of the invention involves identifying these goods in accordance with such characteristics for further providing such information to a host computer database 17. To accomplish, the incoming goods are scanned, utilizing standard scanners, preferably of the hand-held variety. These scanners may read the bar codes if provided or be programmed to detect and read other characteristics such as mentioned above. Such identification may also include weighing of the goods if this particular characteristic is desired (as it most likely will be). Thus, a combination of apparatus may be used to provide goods identification to assure the correct characteristics required. After obtaining these particular characteristics, as stated, these are provided to the host computer database and retained there in accordance with a program established for this purpose. Such a program is within the scope of those skilled in the art and further description is not believed necessary.

In addition to the goods characteristics, the information provided to the database at this time may also include the identification of the person or persons receiving the goods to thus assure greater security thereof (e.g., to deter the opportunity for theft or to assure accountability for subsequent misplacement).

The next step in tracking the goods is a very important one, and involves the encryption (encoding) of the identification information in the database and thereafter providing a unique, encoded readable code for each of the goods received. This encryption and code provision may be accomplished utilizing conventional software or through utilization of a developed program, which may be developed utilizing skills known in the art. The encoded information is also stored within the computer database 17 for future reference and possible modification (if desired).

As mentioned above, the invention is adaptable for use in a warehouse or the like situation in which storage is possible or, alternatively, where subsequent distribution (shipping) of the goods is desired without such storage. The Drawing illustrates both possibilities, showing the goods as being directly moved (e.g., using a forklift truck) to suitable storage (e.g., shelving or the like), or directly to a shipping location (department) for subsequent shipping (distribution) to designated recipients 19. In the case of perishable items such as certain food products, it may be desirable to immediately ship these goods rather than store same, but it is also within the scope of the invention to provide such storage (e.g., in suitable cold storage such as freezers). In either case, before moving from the receiving location, the goods are provided with the encrypted bar code label (having the encoded readable code), preferably being manually applied by a human receiver upon receiving these codes from the host computer. It is also within the scope of the invention to utilize mechanical or other application apparatus to accomplish this in a more automated fashion, e.g., as the goods pass down a conveyor system. The latter would be preferred if similar goods are received, while the use of a human applicator is preferred for goods of various types, sizes, volumes, etc.

If the goods are to be stored, each of the storage shelves include a unique identification bar code attached thereto such that when a particular good is stored thereon, this unique identification bar code, together with the encrypted bar code on the respective goods (and, again, possibly the identification of the person handling these goods) is transmitted to the host computer for corresponding database updating. The precise location of any one set of goods within the warehouse is thus readily discernible by accessing the database, e.g., from a monitor or the like at an appropriate location within the warehouse storage location. Hand-held monitors are also usable for this purpose. It is understood that if the goods are shipped directly from the receiving location to shipping, they will only contain the encoded readable codes thereon, including, again, the possible identification of the respective handler transporting these goods.

In order to fill an order for goods held in storage, the order filler will determine the location of the goods according to the information provided by the host computer and transport these to the shipping location, also sending the host computer his own biometric data (identification) if required. The host computer now knows the person handling the goods, and all important characteristics thereof such as quantity, type, weight, volume, etc. Once the goods reach the shipping location, receivers at the location also input their own biometric data to the host computer, along with the goods data. The computer now knows that the goods are no longer in storage but awaiting shipment When the goods are placed on the selected means of transportation (e.g., a truck), the encoded readable codes of each are scanned once again, and other identification (that of the trucker) is forwarded to the host computer. In the figure, this is shown as "shipping data". It is also within the scope of this invention that the shipper have his/her own access to the host computer database to be assured that he/she is receiving the precise quantity and type of goods he/she is now responsible for transporting. Once confirmation is attained, shipment (distribution) is now possible.

The Drawing indicates that air, land or sea transportation is possible for the goods now including the designated shipping data. Examples are airplane, truck and ship, respectively. The invention is readily adaptable for all such means of transportation. The invention is not limited to just these three particular elements (airplane, truck or ship) as others are possible (e.g., railroad cars).

To assure still further precise tracking of these goods, it is also within the scope of the invention to provide a generated bar code for the transporting vehicle such that this may also be scanned or otherwise read at designated locations distant from the warehouse to assure proper and timely distribution in accordance with the most efficient channels. For example, a bar code scanner could be positioned at a specified location distant from the warehouse to assure that a particular vehicle (e.g., a truck) passed thereby within an appropriate time period from departure, thus also assuring that the vehicle is on the correct and most efficient route to the ultimate recipient. Should deviations from these desired readings occur, corrective action may be promptly taken, including contacting the transporter (if possible) or appropriate law enforcement agencies (should theft be deemed possible).

Once the goods are distributed to the respective recipients 19, it is within the scope of the invention to provide each of these recipients with access to the host computer database, and particularly the information therein pertaining to the shipped orders. In the Drawing, access is shown (in dotted line) between the shipping department and recipient and this is understood to mean that the recipient is accessing information at the shipping department which in turn has received the appropriate information from the host computer database. It is also within the scope of the invention to have the recipients directly access the database, this perhaps being a more efficient means should it not be desirable to involve shipping personnel or the like and there are appropriate personnel serving the host database capable of doing so. Each recipient will thus access information obtaining the necessary coded information for the goods, and the biometric identification information of the respective transporter who brought the goods to the recipient's location. This thus assures that the correct transporter is transporting the goods in question and that the goods are identical to those which left the shipping department destined for said recipient. This is especially important for security reasons, e.g., to assure tampering or theft has not occurred. The goods in such a situation are preferably locked within the transporting apparatus and can provide further means of protection in addition to the unique teachings of the instant invention.

In an alternative embodiment, it is possible to provide a more enhanced means of assuring positive tracking of the respective goods through the process. An example of such enhanced tracking is the use of radio frequency identification. If used, appropriate radio frequency identifiable codes would form the encoded readable codes and secured to each of the goods being tracked. Thus, a radio frequency tag could be attached to the goods at receipt and subsequently used throughout the system, including having this tag updated with the aforementioned information at various parts of the process. Reading of the respective tags can be accomplished by a human being wearing a portable computer with voice command capabilities along with a low power radio frequency reader. The human user can update the tag (preferably including a logic chip as part thereof) with his/her own biometric information, the chosen storage shelf location, etc. The tag can also be updated with the shipping department information and that of the chosen carrier. The use of radio frequency tags and associated hardware (e.g., satellite and cell phone connections) is desirable due to the enhanced capabilities of such advanced technologies. Each radio frequency tag could be in relatively simple "button" form and pressed onto or pinned into the goods, a container having a specified quantity of such goods therein, etc. The tag would also preferably include its own antenna for receiving information as necessary to effectively operate the process, such as information from a satellite or the like. Such information could include global positioning information such that both shipper and recipient (customer) can quickly ascertain the precise location of respective goods at any time, night or day.

The invention as defined herein provides for the quick and efficient tracking of goods of many different types such that these goods are correctly stored (if desired) and distributed to designated recipients such as purchasing customers. The system assures that by use of its encoded readable codes that theft, tampering, misplacement, etc., are substantially eliminated. Further, the invention as defined herein uses, for the most part, known technologies (e.g., bar code readers) and is thus relatively inexpensive to build, operate and maintain.

While there have been shown and described what are at present the preferred embodiments of the invention, it will be obvious to those skilled in the art that various changes and modifications may be made therein without departing from the scope of the invention as defined by the appended claims.

What is claimed is:

1. A method of tracking goods, the method comprising:
  receiving goods at a specified location;
  pinning a radio frequency device to each of the goods to thereby secure each radio frequency device to each of the goods;
  identifying each of the goods in accordance with a characteristic thereof at the specified location and thereafter providing the characteristic for each of the identified goods to a host database;
  encoding each said characteristic of the goods and producing a distinct encoded readable code for each of the goods, the encoding being within the radio frequency device secured to each of the goods;
  after the encoding is performed, storing each of the goods on a chosen storage shelf of a plurality of storage shelves at the specified location, the chosen storage shelf having location information;
  attaching a readable identification code to each one of the plurality of storage shelves;
  reading by a portable computer each of the radio frequency devices, the portable computer worn by a human being, and the portable computer having voice command capabilities and a low power radio frequency reader;
  for each of the goods being stored, updating the radio frequency tags with biometric information of the human being and with the location information of the chosen storage shelf;
  transmitting the distinct encoded readable code and the readable identification code to the host database for updating the host database;
  after the transmitting is performed, determining the location of the goods by a human order filler according to information provided by the host database;
  sending biometric data of the human order filler to the host database for indicating that the human order filler has handled the goods;
  transporting the goods to a shipping location, the transporting performed by the human order filler;
  after the goods are received at the shipping location, sending biometric data of a human receiver to the host database for indicating that the human receiver has handled the goods, the human receiver located at the shipping location;
  moving the goods to selected recipients at selected locations distant from the specified location, the goods having the distinct encoded readable codes within each of the radio frequency devices secured thereto; and
  providing each of the selected recipients with its own radio frequency reading apparatus such that the selected recipients can access the host database upon receipt of the goods to assure proper receipt of the goods, the goods having the distinct encoded readable codes within respective ones of the radio frequency devices.

* * * * *